(12) United States Patent
Sobue

(10) Patent No.: US 7,342,459 B2
(45) Date of Patent: Mar. 11, 2008

(54) CLOCK REPRODUCTION CIRCUIT

(75) Inventor: Toshiharu Sobue, Tokyo (JP)

(73) Assignee: NEC Corporation (JP)

( * ) Notice: Subject to any disclaimer, the term of this patent is extended or adjusted under 35 U.S.C. 154(b) by 140 days.

(21) Appl. No.: 11/392,041

(22) Filed: Mar. 29, 2006

(65) Prior Publication Data

US 2006/0232317 A1    Oct. 19, 2006

(30) Foreign Application Priority Data

Mar. 29, 2005    (JP)    ............................. 2005-094296

(51) Int. Cl.
*H03L 7/00* (2006.01)

(52) U.S. Cl. ...................... 331/1 A; 327/291; 375/286; 375/287; 375/294

(58) Field of Classification Search ................ 331/1 A; 327/291; 375/286, 287, 294
See application file for complete search history.

(56) References Cited

U.S. PATENT DOCUMENTS 7,099,400 B2 *    8/2006    Yang et al. .................. 375/287

FOREIGN PATENT DOCUMENTS

JP    05-236043    9/1993

\* cited by examiner

*Primary Examiner*—Arnold Kinkead
(74) *Attorney, Agent, or Firm*—Ostrolenk, Faber, Gerb & Soffen, LLP

(57) ABSTRACT

A clock reproduction circuit receives a multi-valued input data signal to generate a reproduced clock signal with a higher accuracy. The clock reproduction circuit includes a data judgement block which judges whether or not three consecutive data are such that a first-order data is equal to a third-order data and is not equal to a second-order data, and a phase-locked-loop (PLL) which controls or does not control the phase of the reproduced clock depending on the judgement result by the data judgement block.

5 Claims, 2 Drawing Sheets

CLOCK REPRODUCTION CIRCUIT

BACKGROUND OF THE INVENTION

1. Field of the Invention

The present invention relates to a clock reproduction circuit and, more particularly, to a clock reproduction circuit that reproduces a clock signal from an input serial data signal including multi-valued data.

2. Description of the Related Art

There is known a signal transmission system that uses multi-valued data in place of binary data, in a serial data signal to be transmitted. Patent Publication JP-05-236043A describes a clock reproduction circuit used in a multi-valued data receiving circuit. In general, a clock reproduction circuit installed in a receiving circuit detects the falling edge and the rising edge of a transmitted serial data signal and sets the clock pulse of the reproduced clock signal between the rising edge and the falling edge or between the falling edge and the rising edge.

The clock reproduction circuit described in JP-05-236043A detects a timing at which multi-valued data crosses a plurality of reference voltage levels and compares the phase between the detected timing and the output clock signal of the clock reproduction circuit, to thereby output a phase error signal in proportion to the result of the phase comparison. Based on the magnitude of the phase error signal, the phase and frequency of the reproduced clock are controlled. The clock reproduction circuit adopts the method described above to allow the reproduced clock signal in the receiving circuit to be pulled in synchrony with the transmitted data signal at a high speed.

In the case where multi-valued data is used in a high-speed signal transmission system, a transmission data signal assumes a plurality of levels of signal amplitude corresponding to the data values. Accordingly, the timing at which an input signal crosses a plurality of reference voltages in the receiving circuit varies depending on the value of the data transmitted. Therefore, if a technique is used in which the rising and falling edges of the transmitted signal are detected and the clock pulse of the reproduced clock signal is set between the rising (falling) edge and the falling (rising) edge, the center of the clock pulse of the reproduced clock signal is deviated from the center of the signal waveform depending on the level of the data value, with the result that jitter is generated in the reproduced clock signal. If the center of the clock pulse of the reproduced clock signal is deviated from the center of the reproduced data, the time margin for identifying the reproduced data is reduced. In particular, the problem of the insufficient time margin will be critical in a higher-speed signal transmission system.

SUMMARY OF THE INVENTION

In view of the above situation of the conventional technique, it is an object of the present invention to provide a clock reproduction circuit capable of setting a larger time margin in the receiving circuit that receives multi-valued data in a high-speed signal transmission system, by suppressing variation in the phase of the clock pulse and generating a stable reproduced clock signal.

It is also an object of the present invention to provide a method for generating a reproduced clock signal from a multi-valued serial data signal.

The present invention provides a clock reproduction circuit for receiving a multi-valued input data signal to generate a reproduced clock signal, including: a data judgement block which judges whether or not three consecutive data of the input data signal are such that a first-order data is equal to a third-order data and is not equal to a second-order data, to output a first judgement result or a second judgement result depending on the judgement; and a phase-locked-loop (PLL) circuit which controls a phase of the reproduced clock signal if the data judgement block outputs the first judgement result, and does not control the phase of the reproduced clock signal if the data judgement block outputs the second judgement result.

The present invention also provides a method for generating a reproduced clock signal based on a multi-valued input data signal, including the steps of: judging whether or not three consecutive data of the input data signal are such that a first-order data is equal to a third-order data and is not equal to a second-order data, to output a first judgement result or a second judgement result depending on the judgement; and controlling a phase of the reproduced clock signal if the data judgement block outputs the first judgement result, without controlling the phase of the reproduced clock signal if the data judgement block outputs the second judgement result.

In accordance with the clock reproduction circuit and method of the present invention, the change timing of the signal including the three consecutive data which change in a symmetrical manner in the signal waveform is used for the phase control performed in the PLL circuit; whereas the change timing of the signal including the three consecutive data which do not change in an asymmetrical manner, that is, the center between the data change timings of the signal waveform does not correspond to the center of the signal data, is not used for the phase control in the PLL circuit. Therefore, it is possible to satisfactorily suppress a variation in the clock pulse to thereby obtain a reproduced clock signal having reduced jitter.

In the clock reproduction circuit according to a preferred embodiment of the present invention, the data judgement block includes: a plurality of comparators for comparing the input data signal against respective reference voltages each corresponding to one of data values in the input data signal, to output respective comparison results; a plurality of latch elements, each disposed corresponding to one of the comparators, for latching the respective comparison results; and a data reproduction block for reproducing the three consecutive data based on the comparison results latched by the latch elements. In this case, the clock reproduction circuit can be realized with a relatively simple structure. A flip-flop may be used as the latch element.

DETAILED DESCRIPTION OF THE PREFERRED EMBODIMENTS

Figure 1:
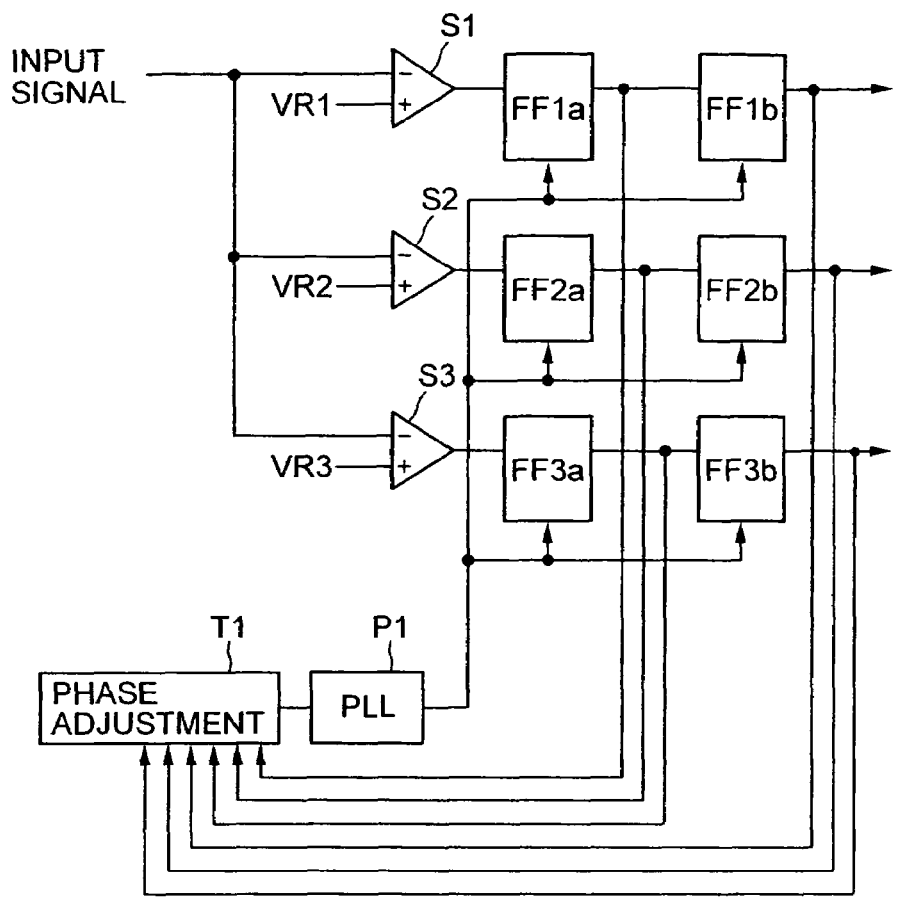
FIG. 1 is a block diagram showing a clock reproduction circuit according to an embodiment of the present invention.

An embodiment of the present invention will be described below with reference to the accompanying drawings. FIG. 1 is a block diagram showing a clock reproduction circuit according to the embodiment of the present invention. The clock reproduction circuit includes a PLL circuit P1, a comparator block including a plurality of comparators S1 to S3 which compare an input signal against respective reference voltage levels VR1 to VR3, a flip-flop block which latches the comparison results from the comparators S1 to S3 in response to the output clock signal from the PLL circuit P1, and a phase adjustment circuit Ti which is attached to the PLL circuit P1 to control the phase adjustment performed by the PLL circuit P1, based on the comparison results latched by the flip-clop block. The serial data signal to be input to the clock reproduction circuit of the present embodiment includes multi-valued data having potential levels VIL1, VIL2, VIL3, VIL4 and assuming any of four data values corresponding to the potential levels.

The serial data signal including multi-valued data is input to each of the comparators S1 to S3. The comparator S1 compares the input serial data signal against the reference voltage VR1 and outputs the comparison result to the flip-flop FF1a. The data of the flip-flop FF1a is delivered to the next flip-flop FF1b. The comparator S2 compares the input serial data signal against the reference voltage VR2 and outputs the comparison result to the flip-flop FF2a. The data of the flip-flop FF2a is delivered to the next flip-flop FF2b. The comparator S3 compares the input serial data signal against the reference voltage VR3 and outputs the comparison result to the flip-flop FF3a. The data of the flip-flop FF3a is delivered to the next flip-flop FF3b. The output data of the flip-flops FF1a, FF1b, FF2a, FF2b, FF3a, FF3b that configure the flip-flop block are delivered to the phase adjustment circuit T1. The phase adjustment circuit T1 controls the PLL circuit P1 based on the outputs from the flip-flops FF1a, FF1b, FF2a, FF2b, FF3a, FF3b.

Figure 2:
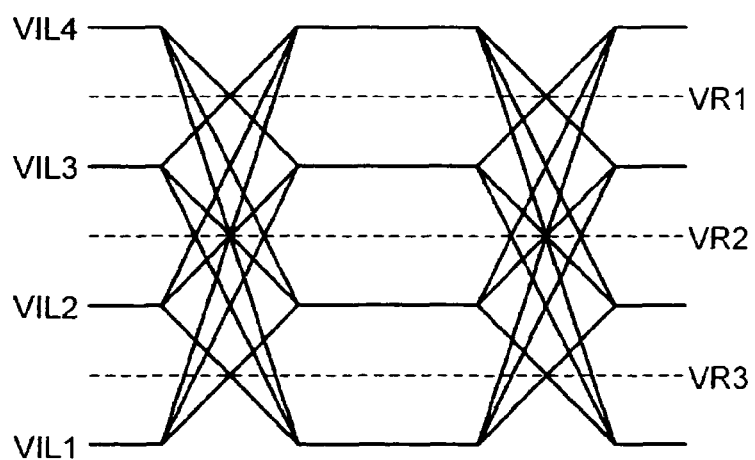
FIG. 2 is a graph showing the general relationship between signal levels of multi-valued data and reference voltages used for detection of the multi-valued data.

FIG. 2 shows the signal waveform of the transmitted multi-valued data. The serial data signal including the multi-valued data has four levels VIL1, VIL2, VIL3, VIL4, as shown in FIG. 2. The receiving circuit generates, within the circuit, three reference voltages VR1, VR2, VR3 and detects whether the received serial data signal assumes any of potential levels VIL1 to VIL4. In addition, the receiving circuit detects the falling or rising edge of the serial data signal, sets the clock pulse of the reproduced clock signal between the rising edge and the falling edge or between the falling edge and the rising edge, and receives therein the transmitted serial data based on the timing of the reproduced clock signal.

Figure 3:
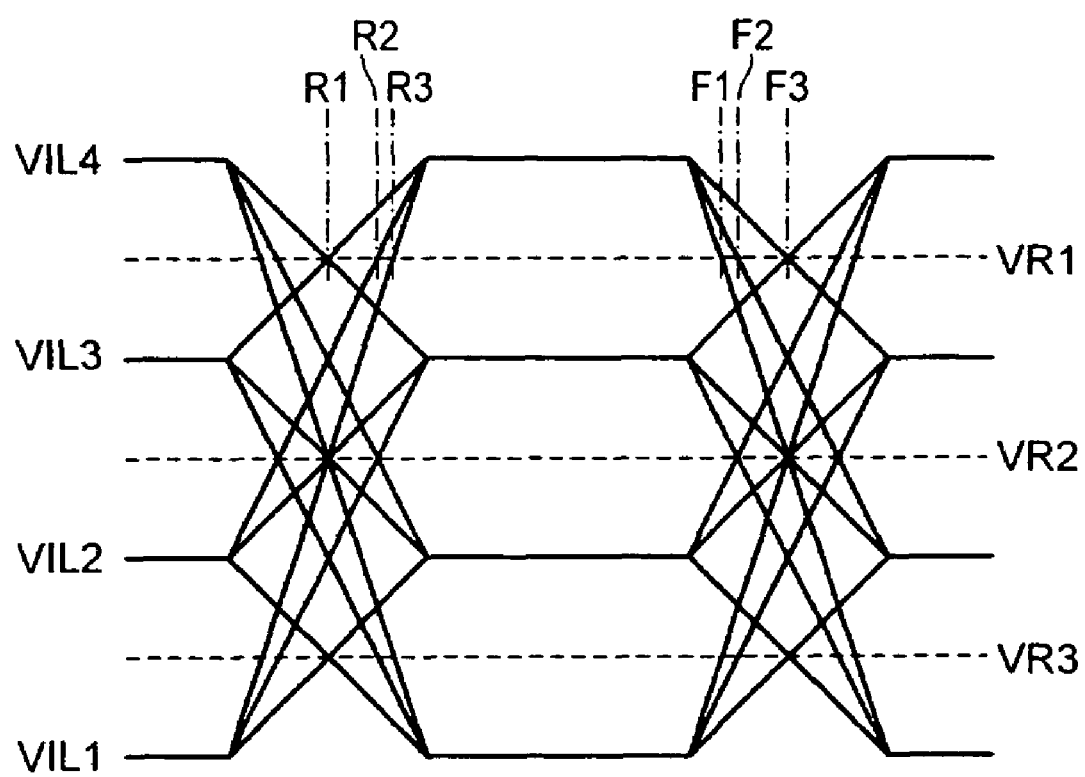
FIG. 3 is a graph showing the change timing patterns of an input signal including multi-valued serial data at the time when the input signal is detected in the comparator shown in FIG. 1.

In transmission of a multi-valued serial data signal, the respective data assume a plurality of potential levels and thus the data signal has a plurality of signal amplitudes. As a result, the timing at which the serial data signal crosses the reference voltages varies depending on the data value. With reference to FIG. 3, this situation will be described in detail.

In the rising edge of the input waveform, the timing at which the input signal crosses the reference voltage VR1 is the time instant:

R3, if the signal level rises from VIL1 to VIL4;
R2, if the signal level rises from VIL2 to VIL4; and
R1, if the signal level rises from VIL3 to VIL4.

Similarly, in the falling edge of the input waveform, the timing at which the input signal crosses the reference voltage VR1 is the time instant:

F1, if the signal waveform falls from VIL4 to VIL1;
F2, if the signal waveform falls from VIL4 to VIL2; and
F3, if the signal waveform falls from VIL4 to VIL3.

The clock pulse of the reproduced clock signal is set between the adjacent edges of the serial data signal. Accordingly, assuming that the timing of the rising edge in the waveform of the input serial data signal is the time instant R1, the location of the clock pulse in the reproduced clock signal varies depending on whether the next timing of the falling edge of the waveform assumes either the time instant F1, F2, or F3. In this case, if the timing of falling edge of the input waveform is F3, the center of the clock pulse of reproduced clock signal is located at the center of the signal waveform, and thus resides at the data center. However, if the timing of falling edge of the input waveform is F1 or F2, the center of the clock pulse in the reproduced clock signal is deviated from the center of the waveform, and thus deviates from the data center.

In view of the characteristics of the above multi-valued data, the clock reproduction circuit according to the embodiment of the present invention is configured to operate as follows. In FIG. 1, the comparators S1, S2, S3 compare the input serial data signal against the reference voltages VR1, VR2, VR3, respectively, and delivers the comparison results each representing "1" or "0" to the flip-flops FF1a, FF2a, FF3a, respectively. The data of the flip-flops FF1a, FF2a, FF3a are then delivered to the flip-flops of the next stage FF1b, FF2b, FF3b in response to the next clock pulse.

Thus, it is possible for the clock reproduction circuit to determine the behavior of the input signal waveform based on the current output data of the flip-flops FF1a, FF2a, FF3a, FF1b, FF2b, FF3b and previous output data of the flip-flops FF1b, FF2b, FF3b. Assuming that the current output data are such that FF1b='1', FF2b='1', FF3b='1', FF1a='0', FF2a='0' and FF3a='0', and the previous output data stored in the phase adjustment circuit T1 are such that FF1b='1', FF2b='1' and FF3b='1', the pattern of the three consecutive data in the input signal thus detected can be represented by a waveform which first assumed VIL1, then VIL4 and finally VIL1. As another example, assuming that the current output data are such that FF1b='1', FF2b='1', FF3b='1', FF1a='0', FF2a='1' and FF3a='1', and the previous output data stored in the phase adjustment circuit T1 are such that FF1b='1', FF2b='1' and FF3b='1', the pattern of the three consecutive data in the input signal thus detected can be represented by a waveform which first assumed VIL1, then VIL4, and finally VIL3.

If the waveform of the input signal assumes VIL1, VIL4 and VIL1 in the order of the occurrence, the input signal crosses the reference voltage VR1 at the time instants R3 and F1 in FIG. 3. In this case, the data signal waveform is symmetric and therefore the center of the clock pulse in the reproduced clock signal can be set at the center of the data signal based on the timing of both the rising and falling edges of the central data (second-order data) having a VIL4 level.

On the other hand, if the waveform of the input signal assumes VIL1, VIL4 and VIL3 in the order of the occurrence, the data signal waveform is asymmetric and the input signal crosses the reference voltage VR1 at the time instants R3 and F3. If the center of the clock pulse in the reproduced clock signal is determined based on the rising and falling edges of the central data having a VIL4 level, the center of the clock pulse is deviated from the center of the signal waveform to the right side.

As described above, in transmission of the multi-valued data, the amount of change (signal amplitude) in the data signal varies depending on the data value, whereby the timing at which the input signal crosses the reference voltage set in the receiving circuit varies depending on the waveform. Therefore, if the clock pulse of the reproduced clock signal is set simply by detecting the rising or falling edge of the serial data signal in the receiving circuit, the center of the clock pulse may be deviated in some cases from the center of the data depending on the pattern of the data signal waveform.

In the present embodiment, the phase adjustment circuit T1 determines how the input signal has changed based on the outputs from the FF1a, FF2a, FF3a, FF1b, FF2b, FF3b and controls the clock phase while using only the following patterns:

VIL1→VIL2→VIL1;
VIL1→VIL3→VIL1;
VIL1→VIL4→VIL1;
VIL2→VIL3→VIL2;
VIL2→VIL4→VIL2;
VIL3→VIL4→VIL3;
VIL2→VIL1→VIL2;
VIL3→VIL1→VIL3;
VIL4→VIL1→VIL4;
VIL3→VIL2→VIL3;
VIL4→VIL2→VIL4; and
VIL4→VIL3→VIL4.

More specifically, only when the signal waveform is changed in a symmetrical manner, the PLL circuit P1 sets the phase of the reproduced clock based on the timing of the central data of the three consecutive data. In the case of the change patterns other than those described above, the PLL circuit P1 does not set the phase of the reproduced clock using the timing of the central data of the three consecutive data, and waits for the subsequent change timing.

As described above, whether or not the phase control is performed for the current signal pattern is determined at each timing in the PLL, thereby allowing the phase of the reproduced clock to be set in the center of the data signal at any time.

Although the two-stage flip-flops are exemplified in the above embodiments, three-stage flip-flops may be used so as to store three consecutive data. Although whether or not the phase control is performed is determined in the PLL circuit in the above embodiment, the phase control may be triggered by a signal from outside. Further, although the multi-valued data has four data values in the above embodiment, the clock reproduction circuit can be applied to the receiving circuit using multi-valued data having any number of data values, so long as the number is equal to or grater then 3.

Although the present invention has been described with reference to the preferred embodiment, the clock reproduction circuit according to the present invention is not limited to the configuration shown in the above embodiment and various changes, modifications, or alternations to the embodiment described herein may be made, none of which depart from the spirit of the present invention. All such changes, modifications, and alternations should therefore be regarded as within the scope of the present invention.

What is claimed is:

1. A clock reproduction circuit for receiving a multi-valued input data signal to generate a reproduced clock signal, comprising:
    a data judgement block which judges whether or not three consecutive data of the input data signal are such that a first-order data is equal to a third-order data and is not equal to a second-order data, to output a first judgement result or a second judgement result depending on the judgement; and
    a phase-locked-loop (PLL) circuit which controls a phase of the reproduced clock signal if said data judgement block outputs said first judgement result, and does not control the phase of the reproduced clock signal if said data judgement block outputs said second judgement result.

2. The clock reproduction circuit according to claim 1, wherein said data judgement block includes:
    a plurality of comparators for comparing the input data signal against respective reference voltages each corresponding to one of data values in the input data signal, to output respective comparison results;
    a plurality of latch elements, each disposed corresponding to one of said comparators, for latching respective said comparison results; and
    a data reproduction block for reproducing said three consecutive data based on said comparison results latched by said latch elements.

3. The clock reproduction circuit according to claim 2, wherein said latch elements latches respective said comparison results in response to the reproduced clock signal.

4. A method for generating a reproduced clock signal based on a multi-valued input data signal, comprising the steps of:
    judging whether or not three consecutive data of the input data signal are such that a first-order data is equal to a third-order data and is not equal to a second-order data, to output a first judgement result or a second judgement result depending on the judgement; and
    controlling a phase of the reproduced clock signal if said data judgement block outputs said first judgement result, without controlling the phase of the reproduced clock signal if said data judgement block outputs said second judgement result.

5. The method according to claim 1, wherein said data judging step includes:
    comparing the input data signal against respective reference voltages each corresponding to one of data values in the input data signal, to output comparison results corresponding to the reference voltages;
    latching said comparison results in response to the reproduced clock signal; and
    reproducing said three consecutive data based on said comparison results latched by said latch elements.

* * * * *